United States Patent
Takeuchi

[11] Patent Number: 5,980,820
[45] Date of Patent: Nov. 9, 1999

[54] BALL LINEAR GUIDE AND MANUFACTURING METHOD THEREOF

[75] Inventor: Mitsuo Takeuchi, Iwaki, Japan

[73] Assignee: Takeuchi Precision Works Co., Ltd., Iwaki, Japan

[21] Appl. No.: 09/123,471

[22] Filed: Jul. 28, 1998

Related U.S. Application Data

[62] Division of application No. 08/897,038, Jul. 18, 1997, Pat. No. 5,851,073.

[30] Foreign Application Priority Data

Jul. 23, 1996 [JP] Japan ................................. 8-193248

[51] Int. Cl.$^6$ ........................................................ B22F 5/10
[52] U.S. Cl. ................................... 419/37; 419/5; 419/60
[58] Field of Search ................................. 419/37, 60, 5; 264/645

[56] References Cited

U.S. PATENT DOCUMENTS 2,620,163 12/1952 Stone .
3,950,040 4/1976 Fall .
4,551,895 11/1985 Teramachi .
5,076,713 12/1991 Morita .
5,624,195 4/1997 Abe et al. .
5,640,768 6/1997 Teramachi .

*Primary Examiner*—Ngoclan Mai
*Attorney, Agent, or Firm*—Antonelli, Terry, Stout & Kraus, LLP

[57] ABSTRACT

A ball linear guide includes a ball-cyclic-running path composed of a loaded ball groove and a non-loaded ball groove, wherein said ball linear guide main body is of a single structure including: a dovetail groove having at both ends thereof an inlet and an outlet for balls; and a tunnel-like non-loaded ball hole being continuous to said dovetail groove with said inlet and said outlet being as both ends thereof. The tunnel-like non-loaded ball hole is manufactured by forming, around a tunnel-like core, an iron alloy containing about 0.85 wt % of C, about 0.3% of Si, about 0.3 wt % of Mo, about 4.0 wt % of Cr, about 5.0 wt % of Mn, about 6.0 wt % of W, about 2.0 wt % of V, and/or about 0.6 wt % of Ti. The ball linear guide allows smooth rotation of balls at a high speed with reduced noise, and also it exhibits a long service life. Further, in the manufacturing method, the number of parts and the number of working steps are reduced, and the assembly is easily performed without great care.

8 Claims, 8 Drawing Sheets

BALL LINEAR GUIDE AND MANUFACTURING METHOD THEREOF

This is a division of application Ser. No. 08/897,038, filed Jul. 18, 1997 now U.S. Pat. No. 5,851,073.

BACKGROUND OF THE INVENTION

1. Field of the Invention

The present invention relates to a ball linear guide and a method of manufacturing the ball linear guide.

2. Description of the Prior Art

Ball linear guides have been used for a variety of applications, for example, X, Y and Z axes of machine tools such as NC machines; and slide portions of other machines, automatic welding machine, injection molding machines, automatic carrying devices, industrial robots, and other general industrial machines.

Ball linear guides have a general configuration that a ball continuously runs cyclically through a ring-shaped ball-cyclic-running path. FIGS. 10, 11 and 12 show an example of a structure of a prior art ball linear guide, wherein FIG. 10 is a perspective view of the structure; FIG. 11 is a sectional view taken on line X—X of FIG. 10, showing a ball-cyclic-running path; and FIG. 12 is a perspective view showing a state in which the structure is assembled.

In these figures, reference numeral 1 indicates a bearing main body placed on a raceway base 2; 3, 4 are end plates, serving as ball returning U-shaped cages, mounted on both ends of the bearing main body 1; 5 is a mounting bolt for mounting the end plates 3, 4 to the bearing main body 1; 6 is a loaded ball groove in the form of a dovetail groove formed in a side surface portion, facing a running surface of the raceway base 2, of the bearing main body 1; 7 is a loaded ball running in the loaded ball groove 6; 8 is a non-loaded ball hole formed on the opposed side to the above side surface portion, facing the running surface of the raceway base 2, of the bearing main body 1; 9, 10 are direction changing U-shaped grooves formed in the end plates 3, 4, respectively; 7' is a non-loaded ball running in each of the non-loaded ball hole 8, and direction changing U-shaped grooves 9, 10; 11 is a ball guiding semi-circular portion; and 12 is a bolt hole for mounting the ball linear guide main body 1 to a mating machine or apparatus. In addition, reference numeral 13 indicates an oil leakage preventive plate mounted on an outer side of each of the end plates 3, 4 with a screw 14.

In such a ball linear guide, a ball runs as the loaded ball 7 in the loaded ball groove 6, turning 180°, as the non-loaded ball 7', in the direction changing U-shaped groove 9 formed in the end plate 3, and it runs through the non-loaded ball hole 8. Then, the ball, as the non-loaded ball 7' turns 180° again in the direction changing U-shaped groove 10 formed in the end plate 4, and it returns, as the loaded ball 7, into the loaded ball groove 6.

In this way, the ball-cyclic-running path, which is composed of the loaded ball groove 6, non-loaded ball hole 8 and direction changing U-shaped grooves 9, 10, takes the form of a field track. Of these components of the ball-cyclic-running path, the loaded ball groove 6 is easy to machine from outside thereof, but each of the non-loaded ball hole 8 and direction changing U-shaped grooves 9, 10 is difficult to machine from outside thereof. For this reason, as shown in FIG. 12, the ball linear guide is manufactured by the steps of separately preparing the components, that is, the ball linear guide main body 1 in which the loaded ball groove 6 and the linear non-loaded ball hole 8 have been already formed, the end plates 3, 4 in which the direction changing U-shaped grooves 9, 10 to be connected to the linear non-loaded ball hole 8 have been already formed, and the ball guiding semi-circular portions 11; and assembling them in one body.

The ball linear guides of this type have been disclosed, for example, in Japanese Patent Publication No. Sho 62-27287.

At present, in general, the bearing main body 1 is formed of a metallic block, and each of the end plates 3, 4 is formed of a resin member having a semi-circular ball path.

Specifically, the end plates 3, 4 having the semi-circular ball paths are fixedly by means of the mounting bolts 5 at both the ends of the bearing main body 1 formed of a block having linear ball paths, to be thus assembled into the ball linear guide.

In the prior art ball linear guide in which the end plates are assembled with the block, there are split lines between the end plates and the block. More concretely, at a mating portion between the end plate and the block, there is formed a step along the circumference of the mating portion of the ball path. That is, there exists a chamfer structure based on the step between the bearing main body 1 and each of the end plates 3, 4. Such a structure tends to obstruct smooth running and rotation of balls through the ball-cyclic-running path. This presents a problem in making difficult high speed rotation of balls and in causing vibrational noise due to the step. For the ball linear guide having end plates made of resin, there arises another problem that it has a low wear resistance and it is low in service life for lack of smooth rotation.

From viewpoint of manufacture, the prior art ball linear guide is disadvantageous in that the number of parts is large due to the split structure. This increases the number of assembling steps, for example, for mounting the end plates using bolt mounting taps and holes, to require mating works for the bolts and parts, thereby increasing the number of working steps. Further, the assembly must be performed with great care. In addition, the prior art manufacturing method requires the expense of a mold for the end plate.

SUMMARY OF THE INVENTION

A first object of the present invention is to provide a ball linear guide allowing smooth rotation of balls at a high speed with reduced noise.

A second object of the present invention is to provide a ball linear guide having a long service life.

A third object of the present invention is to provide a method of manufacturing a ball linear guide, in which the number of parts and the number of the working steps are reduced and the assembly is easily performed without great care.

A fourth object of the present invention is to provide a method of manufacturing a ball linear guide at a low cost.

A fifth object of the present invention is to provide a ball linear guide with a ball-cyclic-running path formed in a circular or elliptical shape.

To achieve the above objects, according to the present invention, there is provided (1) a ball linear guide comprising a ball-cyclic-running path composed of a loaded ball groove and a non-loaded ball groove, wherein the loaded ball groove is constituted by a dovetail groove formed in a side surface portion, facing a running surface of a raceway base, of a ball linear guide main body; and the non-loaded ball hole is formed into a tunnel-shape in the ball linear guide main body with both ends of the loaded ball groove being taken as inlet and outlet of the non-loaded ball hole, characterized in that the ball linear guide main body is of a single structure including: a dovetail groove having at both ends thereof an inlet and an outlet for balls; and a tunnel-like non-loaded ball hole being continuous to the dovetail groove with the inlet and the outlet being as both ends thereof.

(2) In the ball linear guide described in (1), the non-loaded ball hole may includes a straight line portion and U-shaped portions continuous to both ends of the straight line portion.

(3) In the ball linear guide described in (1), the non-loaded ball hole may be formed along an elliptical curve.

(4) In the ball linear guide described in (1), the non-loaded ball hole may be formed along a circular curve.

(5) In the ball linear guide described in (3) or (4), a plurality of the ball-cyclic-running paths may be arranged in the forward movement direction of the ball linear guide.

(6) In the ball linear guide described in any one of (1) to (5), the single structure may be made of an iron alloy containing C, Si, Mn, Cr, Mo, W, V and/or Ti.

(7) In the ball linear guide described in any one of (1) to (5), the single structure may be made from an iron alloy containing about 0.85 wt % of C, about 0.3% of Si, about 0.3 wt % of Mn, about 4.0 wt % of Cr, about 5.0 wt % of Mo, about 6.0 wt % of W, about 2.0 wt % of V, and/or about 0.6 wt % of Ti.

To achieve the above objects, according to the present invention, there is provided (8) a method of manufacturing a ball linear guide including a ball-cyclic-running path composed of a loaded ball groove and a non-loaded ball groove, wherein the loaded ball groove is constituted by a dovetail groove formed in a side surface portion, facing a running surface of a raceway base, of a ball linear guide main body; and the non-loaded ball hole is formed into a tunnel-shape in the ball linear guide main body with both ends of the loaded ball groove being taken as inlet and outlet of the non-loaded ball hole, the method comprising:

a first step of preparing a core having a structure corresponding to a structure of the ball-cyclic-running path;

a second step of mounting the core prepared in the first step in a mold for forming an outer portion of the ball linear guide main body;

a third step of injection-molding a pellet of a metal powder kneaded with a binder in the mold prepared in the second step;

a fourth step of heating the ball linear ball guide main body molded in the third step at a low temperature in vacuum, thereby removing a material of the core; and a fifth step of sintering the metal powder in the mold from which the material of the core is removed in the fourth step.

(9) In the method of manufacturing a ball linear guide described in (8), cores for threaded holes to be provided in the ball linear guide main body may be prepared when the core for the ball-cyclic-running path is prepared, and may be mounted in the mold for molding the outer portion of the ball linear guide main body in the third step.

(10) In the method of manufacturing a ball linear guide described in (8) or (9), the core may be made of a low melting point acrylic resin.

(11) In the method of manufacturing a ball linear guide described in (8), (9) or (10), the metal powder containing the binder may be sintered into an iron alloy containing 0.85 wt % of C, about 0.3% of Si, about 0.3 wt % of Mo, about 4.0 wt % of Cr, about 5.0 wt % of Mn, about 6.0 wt % of W, about 2.0 wt % of V, and/or about 0.6 wt % of Ti.

The ball linear guide having the above configuration allows smooth rotation at a high speed with a reduced noise and it exhibits a long service life. In the method of manufacturing the ball linear guide, the number of parts and the number of working steps can be reduced and the assembly can be easily performed without great care, so that and the manufacturing cost can be reduced. Also, the present invention provides a ball linear guide including a ball-cyclic-running path having a circular or elliptical shape. Therefore, the ball linear guide and the manufacturing method thereof according to the present invention exhibit a large industrial effect.

DESCRIPTION OF THE PREFERRED EMBODIMENTS

Hereinafter, embodiments of the present invention will be described with reference to the drawings.

Figure 1:
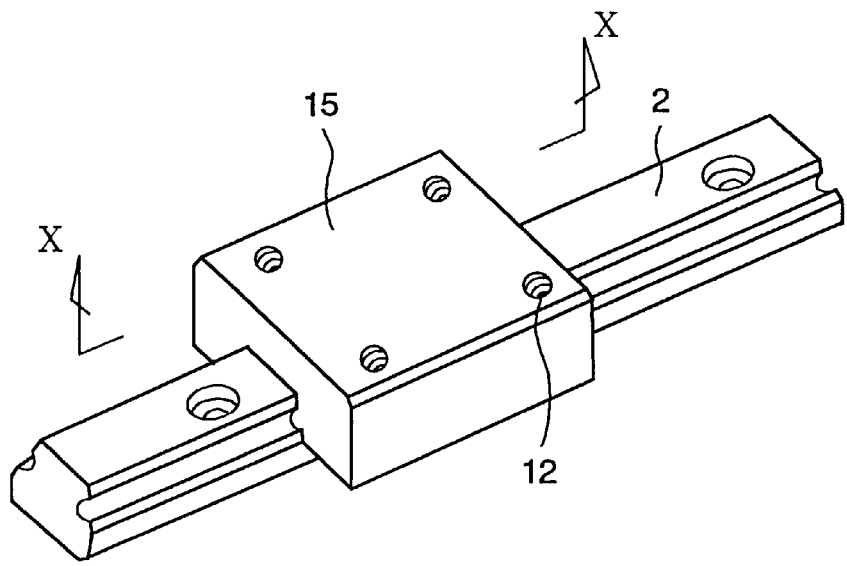
FIG. 1 is a perspective view of one embodiment of a ball linear guide of the present invention.
Figure 2:
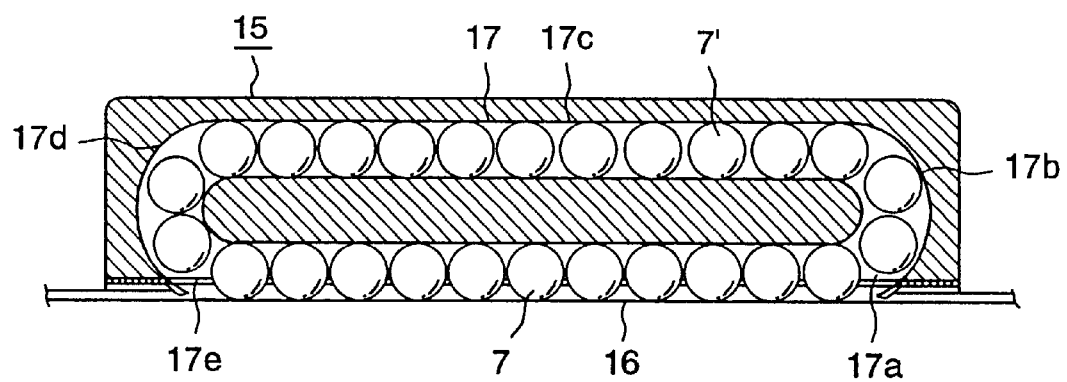
FIG. 2 is a sectional view taken on line X—X of FIG. 1.
Figure 3:
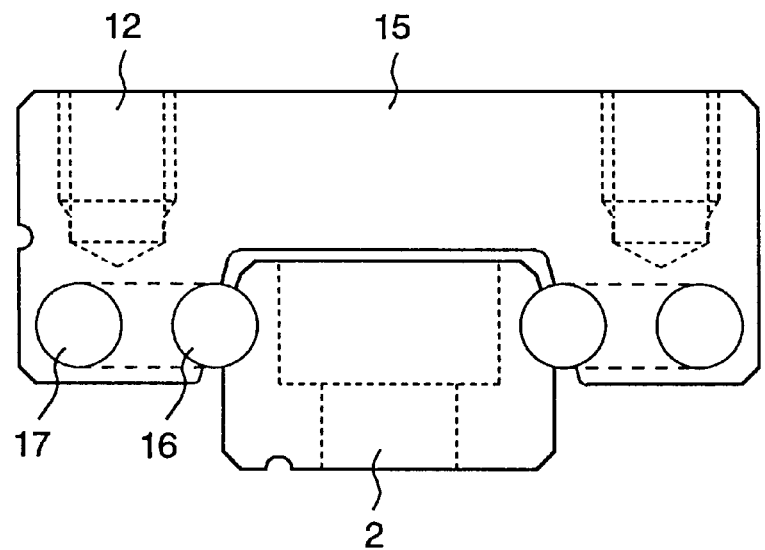
FIG. 3 is a sectional view seen from the direction perpendicular to the traveling direction of the ball linear guide of FIG. 1.
Figure 10:
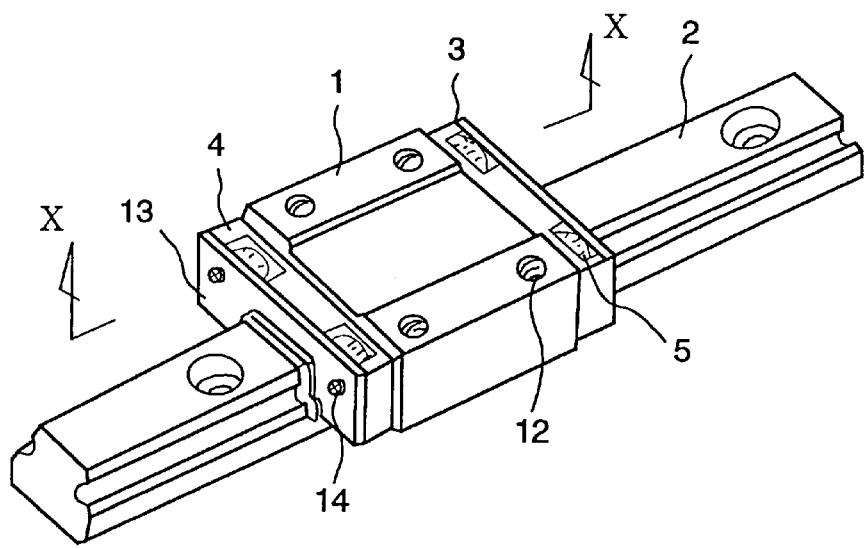
FIG. 10 is a perspective view of one example of a prior art ball linear guide.
Figure 11:
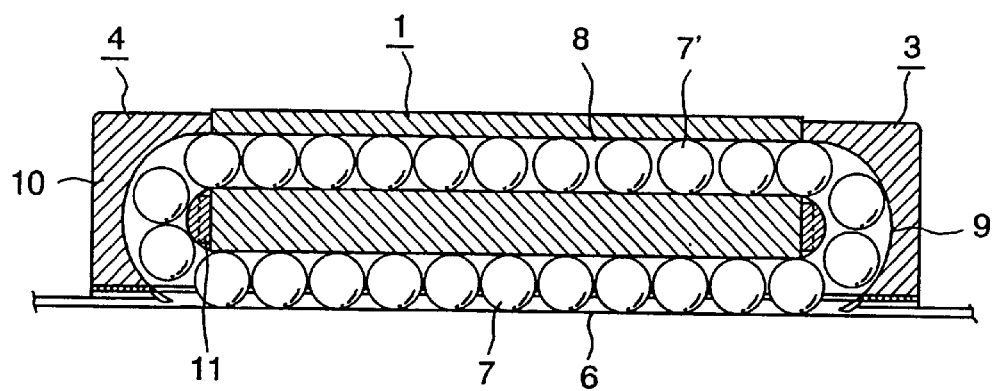
FIG. 11 is a sectional view taken on line X—X of FIG. 10.
Figure 12:
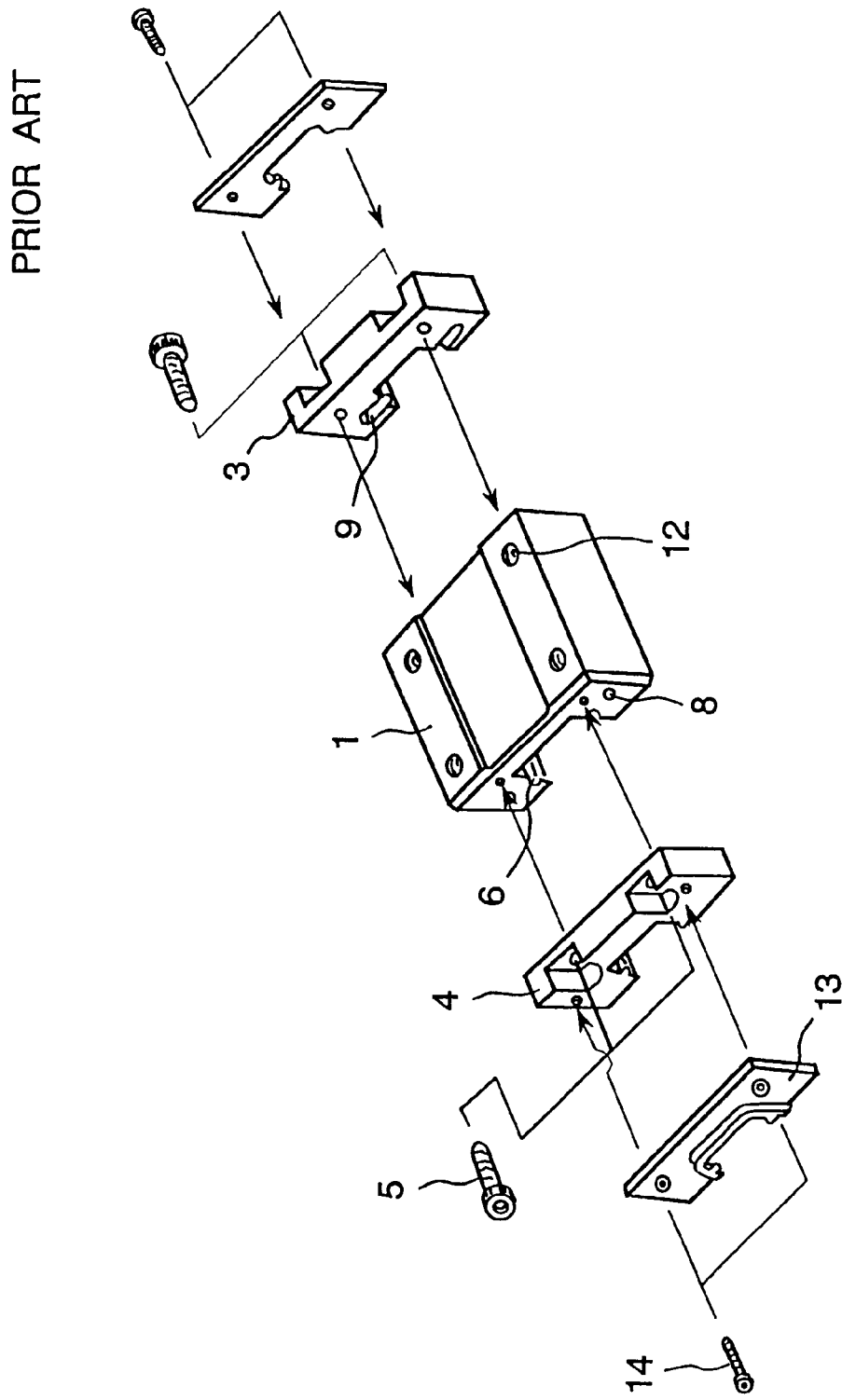
FIG. 12 is a perspective view showing a state in which the ball linear guide shown in FIG. 10 is assembled.

FIG. 1 is a perspective view of an embodiment of a ball linear guide of the present invention; FIG. 2 is a sectional view taken on line X—X of FIG. 1, showing a cross-section of a ball-cyclic-running path; and FIG. 3 is a sectional view seen from the direction perpendicular to the traveling direction of the ball linear guide. In these figures, parts corresponding to those shown in FIGS. 10 to 12 are indicated by the same characters.

In FIGS. 1 to 3, reference numeral 15 indicates a ball linear block (hereinafter, referred to as "an integral ball linear block"), which is equivalent to an integral body of the ball bearing main body 1 and the end plates 3, 4 shown in FIGS. 10 to 12; 16 is a loaded ball groove as a ball going path formed in a dovetail groove portion of the integral ball linear block 15, which is equivalent to the loaded ball groove 6 shown in FIGS. 10 to 12; and 17 is a non-loaded ball hole as a ball returning path provided in the form of a tunnel shape in the integral ball linear block 15, which is equivalent to a ball groove composed of the non-loaded ball hole 8 and the direction changing U-shaped grooves 9, 10 shown in FIGS. 10 to 12. It is to be noted that an oil leakage preventive plate may be mounted at each end of the integral ball linear block 15, similarly to the prior art ball linear guide shown in FIGS. 10 to 12.

In such a ball linear guide, a ball as a loaded ball 7, which is guided along the loaded ball groove 16 of the integral ball linear block 15, runs when the integral ball linear block 15 is moved, and it turns at a region from the tunnel inlet 17a of the non-loaded ball hole 17 and a semi-circular portion 17b formed in the integral ball linear block 15. Then, the ball enters a linear portion 17c as a non-loaded ball 7', turning at the other semi-circular portion 17d formed in the integral ball linear block 15, and goes out of the tunnel outlet 17e. The ball is then introduced, as the loaded ball 7, in the loaded ball groove 16 in the dovetail groove portion of the integral ball linear block 15.

Next, there will be described one embodiment of a method of manufacturing a ball linear guide according to the present invention. The integral ball linear block 15 is manufactured in accordance with the following steps:

(1) Step 1: Upper and lower molds for forming an outer portion of the integral ball linear block 15 and cores inserted in the molds are prepared. One of the cores corresponds to the loaded ball groove 16 as the ball going path formed in the dovetail groove portion of the integral ball linear block 15. Another core corresponds to the non-loaded ball hole 17 as a ball returning path formed into a tunnel shape in the integral ball linear block 15 (which is equivalent to a non-loaded ball hole composed of the ball path formed in the bearing main body 1 and the U-shaped grooves formed in the end plates 3, 4 mounted at both the ends of the bearing main body, in the prior art ball linear guide). The other core corresponds a recessed portion facing a raceway base 2 of the ball linear guide. In addition, each core is made from a low melting point acrylic resin.

Figure 4:
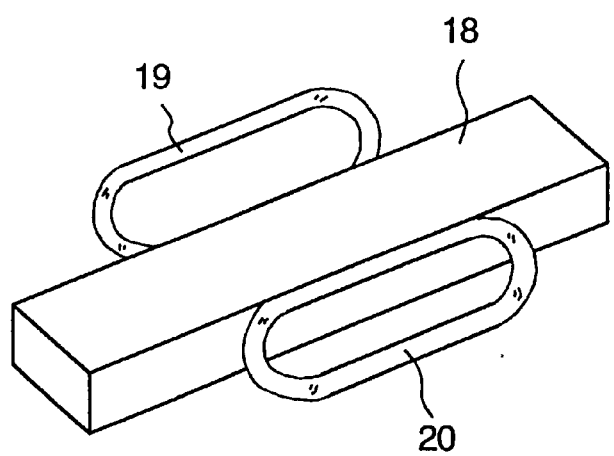
FIG. 4 is a perspective view of inserted cores used in an embodiment of a method of manufacturing a ball linear guide according to the present invention.

FIG. 4 is a perspective view showing shapes of these inserted cores. In this figure, reference numeral 18 indicates a core corresponding to a recessed portion facing the raceway base 2 of the ball linear guide; and 19, 20 are cores corresponding to the loaded ball groove 16 and the non-loaded ball hole 17 formed in the integral ball linear block 15, respectively.

Figure 5:
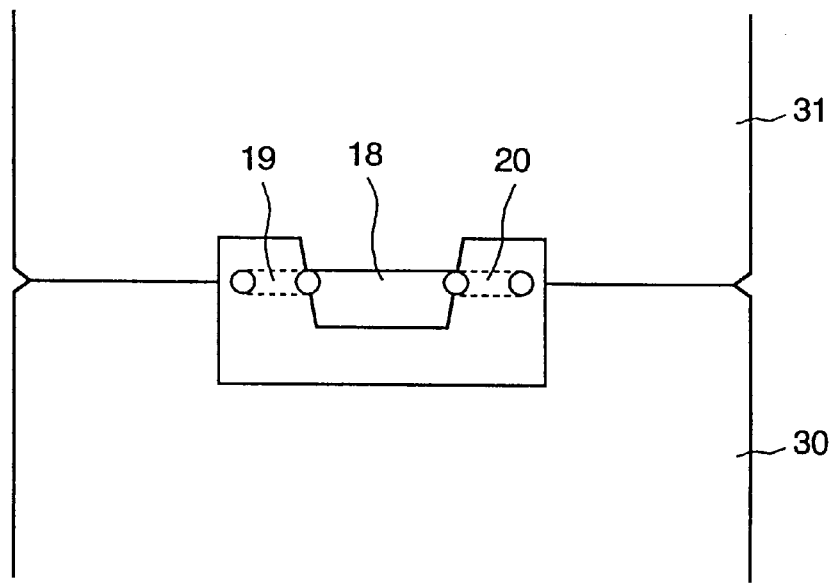
FIG. 5 is a sectional view showing a state in which the cores shown in FIG. 4 is fixed between upper and lower molds for forming an integral ball linear block.

(2) Step 2: As shown in FIG. 5, the cores 18, 19 and 20 prepared in Step 1 are disposed in the lower mold (indicated by reference numeral 30) for forming the outer portion of the integral ball linear block 15, and the upper mold (indicated by reference numeral 31) is placed on the lower mold 30 while putting the cores 18, 19 and 20 therebetween.

Figure 6:
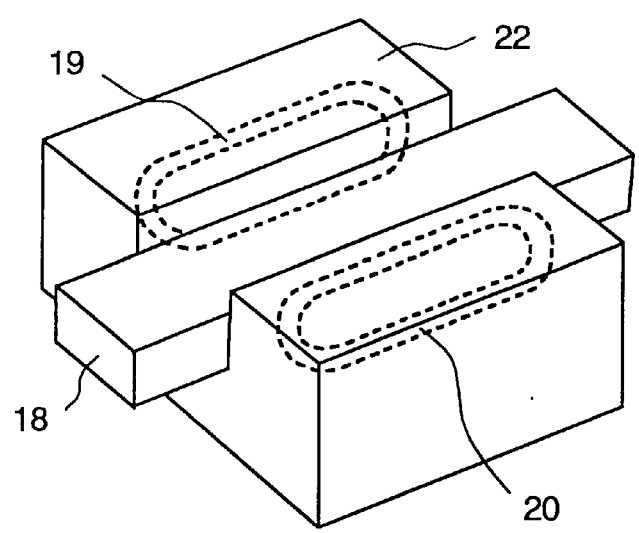
FIG. 6 is a perspective view of a body molded by injection-molding using the molds and the cores shown in FIG. 5.

(3) Step 3: A pellet prepared by kneading a metal power and a binder is injection-molded in a space formed by the lower mold 30 and the upper mold 31 with the cores 18, 19 and 20 inserted therebetween, to form a block of a molded body integrated with the cores 18, 19 and 20 as shown in FIG. 6. In this case, there is used as the binder wax making smooth injection-molding of the metal powder.

In this embodiment, as the metal powder, there is used a powder of a material containing, for example, C, Si, Mn, Cr, Mo, W, V, and Ti, the balance being Fe. The use of the metal powder containing Ti is effective to prevent oxidation of the molded body made of the metal powder upon cooling thereof, and hence to ensure a highly accurate finish-surface which will constitute an inner wall surface of a ball-cyclic-running path.

As the binder, there is used a material formed by mixing and kneading polyethylene, methacrylic acid, normal paraffin, cycloparaffin, and dioctylphthalate at 180° C.

The pellet used here contains about 58 (55–58) vol % of the metal powder, 42% of the binder, and 3% of carbon.

(4) Step 4: The molded body formed by injection-molding of the metal powder in Step 3 is heated at a low temperature. In this treatment, the inserted cores 18, 19 and 20 made of the low melting point acrylic resin are melted and evaporated, to form tunnel-shaped cavities in the molded body made of the metal powder.

Although the core is made from the low melting point acrylic resin in this embodiment, it may be made from any one of low melting point resins. The heating required for removing the cores made from the low melting point acrylic resin is controlled at temperatures of 60° C., 100° C., 160° C., 200° C., 240° C., and 400° C. for 30 min, 30 min, 30 min, 2 hr, 1.5 hr, and 1.5 hr, respectively.

(5) Step 5: The molded body is then heated in vacuum, that is, subjected to vacuum sintering, to form an integral ball linear block 15.

Figure 7:
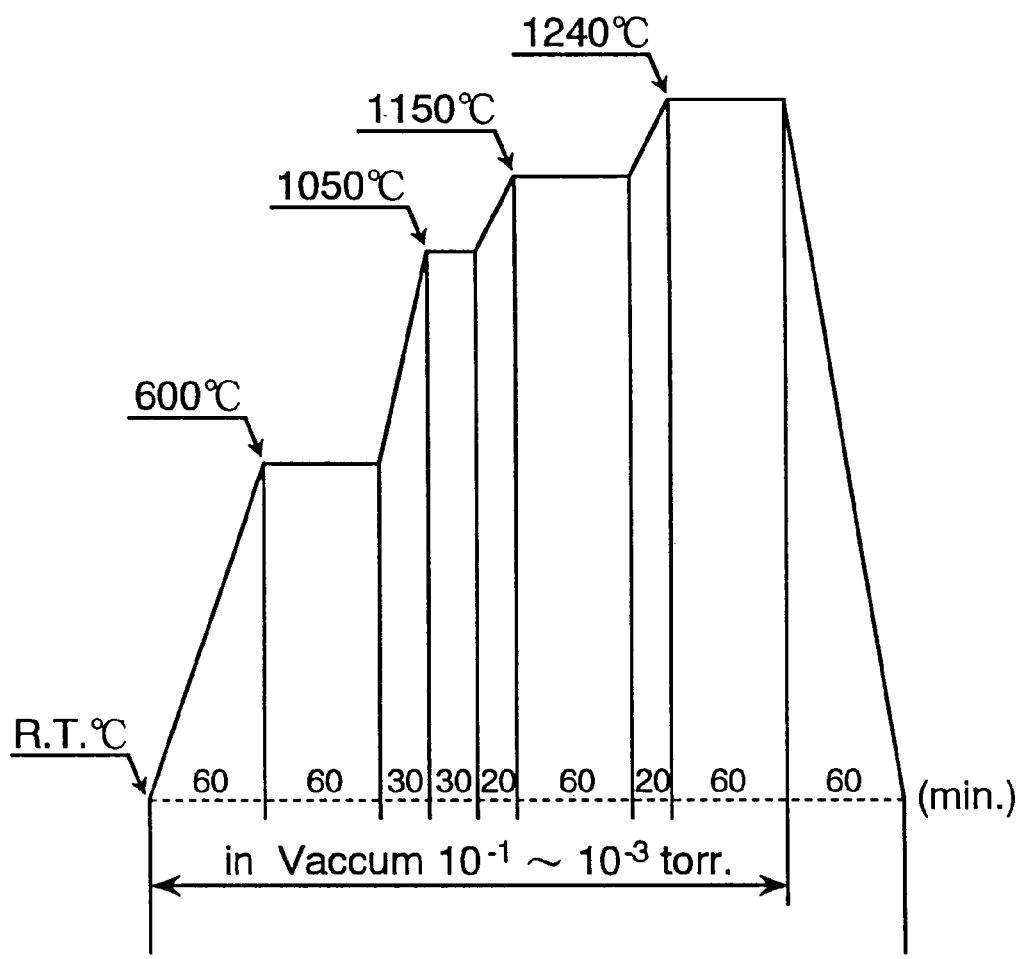
FIG. 7 is a diagram illustrating the embodiment of the method of manufacturing a ball linear guide according to the present invention.

FIG. 7 is a diagram illustrating a process of vacuum-sintering the molded body. In this figure, the abscissa indicates the time and the ordinate indicates the treatment temperature. Since the melting point of an alloy formed from the metal powder is in the order of 1200° C. and that of the low melting point acrylic resin is less than 220° C., the metal powder is not thermally converted in Step 4 in which the low melting point acrylic resin is removed by evaporation, and it is sequentially sintered as the treatment temperature is increased in Step 5.

In addition, according to the method of the present invention, bolt holes (threaded holes) for fixing the ball linear guide to a mating machine or apparatus can be formed in the ball linear guide simultaneously with formation of the ball-cyclic-running path, more simply and easily as compared with the thread-cutting work. Specifically, cores corresponding to threaded holes for the ball linear guide are formed when the cores corresponding to the ball-cyclic-running path are formed at Step 2, and are inserted in the molds for forming the outer portion of the integral ball linear block 15 in Step 3. This is effective to eliminate the thread-cutting work for the bolt holes and hence to reduce the number of machining steps.

According to the present invention, there can be manufactured a ball linear guide having a ball diameter of 1.687 mm, in which the diameter of the ball-cyclic-running path is 1.7 mm, the minimum diameter of the loaded ball groove is 10 mm, and the length of the ball-cyclic-running path is in a range of 50 to 100 mm. In addition, such a ball linear guide has a hardness of 58 to 64 (HRC).

As one specific example of the material for the integral ball linear block 15, there can be used an iron alloy containing 0.85 wt % of C, 0.3% of Si, 0.3 wt % of Mn, 4.0 wt % of Cr, 5.0 wt % of Mo, 6.0 wt % of W, 2.0 wt % of V, and 0.6 wt % of Ti, the balance being Fe. A metal powder constituting such an iron alloy is effective to prevent oxidation of a molded body made of the metal powder upon cooling thereof, and hence to allow smooth movement of balls in the integral ball linear block 15.

The material of the integral ball linear block 15 is not limited to the above alloy but may include, for example, an iron alloy containing C, Si, Mn, Cr, Mo, W, V, and further any different alloy insofar as it can be treated in the same manner as that described above.

As described above, according to the method of the present invention, a tunnel-shaped hole can be formed in a bearing main body having a single structure, so that it becomes possible to reduce the number of parts resulting from the single structure and thereby eliminate the use of bolts, to eliminate the mating work of parts unlike the prior art split structure, to reduce the number of assembling steps due to reduction in the number of parts, to reduce the step of machining of bolts for mounting the ball linear guide to a mating machine or apparatus, and to reduce the cost of molds required for the end plates.

A ball linear guide manufactured in accordance with the method of the present invention has a single structure with a tunnel shape, so that it becomes possible to allow smooth rotation of balls by eliminating a step caused by mating ball-running portions and hence to allow high speed rotation of balls, and also to reduce vibrational noise by eliminating the step caused by mating the ball-running portions. The smooth rotation is effective to prolong the service life of the ball linear guide. In addition, since ends plates of the ball linear guide are made of a metal material, it is possible to improve wear resistance thereof.

Figure 8:
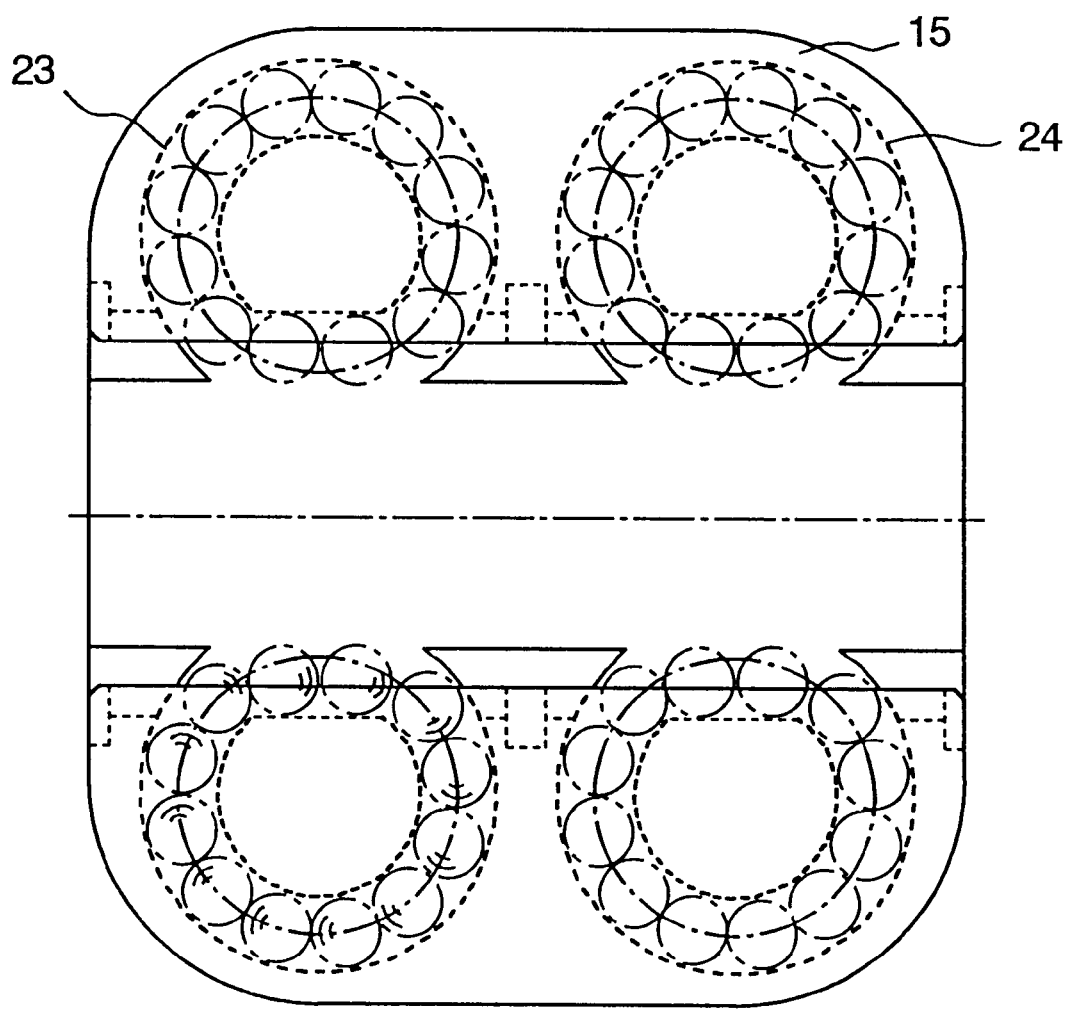
FIG. 8 is a sectional view showing essential portions of another embodiment of the ball linear guide of the present invention.
Figure 9:
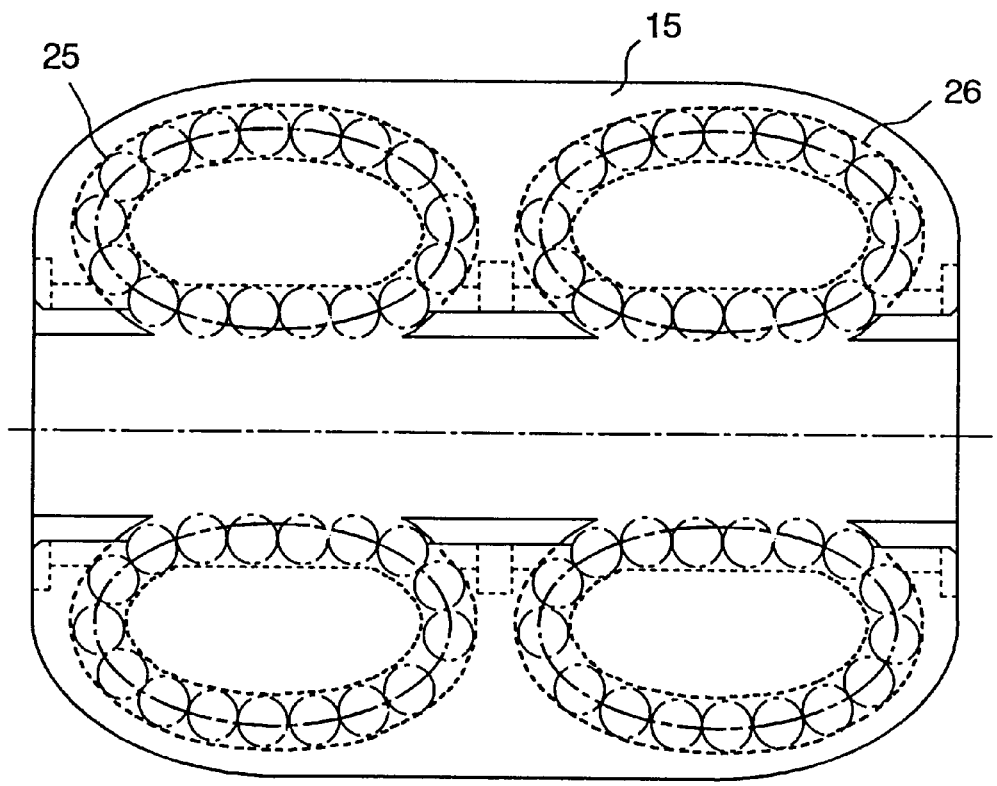
FIG. 9 is a sectional view showing essential portions of a further embodiment of the ball linear guide of the present invention.

FIGS. 8 and 9 show other embodiments of the ball linear guide of the present invention. Of the ball-cyclic-running path, a non-loaded ball hole excluding the loaded ball groove (including the direction changing U-shaped grooves at both the ends of the prior art ball linear guide) is formed in a circular shape (see FIG. 8) or an elliptical shape (see FIG. 9). In each of the embodiments, two of the ball-cyclic-running paths are provided in one bearing main body in the forward movement direction of the ball linear guide. Reference numerals 23, 24 in FIG. 8 indicate circular ball-cyclic-running paths; and reference numerals 25, 26 in FIG. 9 indicate elliptical ball-cyclic-running paths.

Such a structure is difficult to manufacture in accordance with the prior art method of manufacturing the ball linear guide including a field track structure having parallel linear portions and semi-circular portions positioned at both the ends thereof; however, according to the method of the present invention, the structure can be accurately, simply manufactured in the same procedure as described above, because the ball-cyclic-running path can be formed in a continuously smooth curve, such as a circular or elliptical shape.

The circular or elliptical ball-cyclic-running path including the loaded ball groove and the non-loaded ball hole allows balls to be smoothly rotated and thereby smoothly cyclically moved, and hence to increase the rotational speed of the balls. This allows the ball linear guide to be used at a large load resulting from high speed rotation of balls. Further, since the ball-cyclic-running path is formed in a circular or elliptical shape, it becomes possible to provide two or more of ball-cyclic-running paths in one integral ball linear block, that is, in the same block, and hence to further improve the rotational speed and also increase the withstand load property.

As described above, the present invention provides a ball linear guide enabling smooth rotation of balls at a high speed with reduced noise and prolonging the service life; and also provides a method of manufacturing an inexpensive ball linear guide, in which the number of parts and the number of working steps can be reduced and the assembly can be easily performed without great care.

What is claimed is:

1. A method of manufacturing a ball linear guide including a ball-cyclic-running path composed of a loaded ball groove and a non-loaded ball groove, wherein said loaded ball groove is constituted by a dovetail groove formed in a side surface portion, facing a running surface of a raceway base, of a ball linear guide main body; and said non-loaded ball hole is formed into a tunnel-shape in said ball linear guide main body with both ends of said loaded ball groove being taken as inlet and outlet of said non-loaded ball hole, said method comprising:

a first step of preparing a core having a structure corresponding to a structure of said ball-cyclic-running path;

a second step of mounting said core prepared in said first step in a mold for forming an outer portion of said ball linear guide main body;

a third step of injection-molding a pellet of a metal powder kneaded with a binder in said mold prepared in said second step;

a fourth step of heating said ball linear ball guide main body molded in said third step at a low temperature in vacuum, thereby removing a material of said core; and a fifth step of sintering said metal powder in said mold from which said material of said core is removed in said fourth step.

2. A method of manufacturing a ball linear guide according to claim 1, wherein cores for threaded holes to be provided in said ball linear guide main body are prepared when said core for said ball-cyclic-running path is prepared, and are mounted in said mold for molding the outer portion of said ball linear guide main body in said third step.

3. A method of manufacturing a ball linear guide according to claim 2, wherein said core is made of a low melting point acrylic resin.

4. A method of manufacturing a ball linear guide according to claim 3, wherein said metal powder containing said binder is sintered into an iron alloy containing 0.85 wt % of C, about 0.3% of Si, about 0.3 wt % of Mo, about 4.0 wt % of Cr, about 5.0 wt % of Mn, about 6.0 wt % of W, about 2.0 wt % of V, and/or about 0.6 wt % of Ti.

5. A method of manufacturing a ball linear guide according to claim 1, wherein said core is made of a low melting point acrylic resin.

6. A method of manufacturing a ball linear guide according to claim 5, wherein said metal powder containing said binder is sintered into an iron alloy containing 0.85 wt % of C, about 0.3% of Si, about 0.3 wt % of Mo, about 4.0 wt % of Cr, about 5.0 wt % of Mn, about 6.0 wt % of W, about 2.0 wt % of V, and/or about 0.6 wt % of Ti.

7. A method of manufacturing a ball linear guide according to claim 2, wherein said metal powder containing said binder is sintered into an iron alloy containing 0.85 wt % of C, about 0.3% of Si, about 0.3 wt % of Mo, about 4.0 wt % of Cr, about 5.0 wt % of Mn, about 6.0 wt % of W, about 2.0 wt % of V, and/or about 0.6 wt % of Ti.

8. A method of manufacturing a ball linear guide according to claim 1, wherein said metal powder containing said binder is sintered into an iron alloy containing 0.85 wt % of C, about 0.3% of Si, about 0.3 wt % of Mo, about 4.0 wt % of Cr, about 5.0 wt % of Mn, about 6.0 wt % of W, about 2.0 wt % of V, and/or about 0.6 wt % of Ti.

* * * * *